US 6,692,398 B1

(12) United States Patent
Sullivan

(10) Patent No.: US 6,692,398 B1
(45) Date of Patent: Feb. 17, 2004

(54) SIMPLIFIED DIFFERENTIAL ASSEMBLY

(75) Inventor: Robert William Sullivan, Fort Wayne, IN (US)

(73) Assignee: Torque-Traction Technologies, Inc., Holland, OH (US)

( * ) Notice: Subject to any disclaimer, the term of this patent is extended or adjusted under 35 U.S.C. 154(b) by 0 days.

(21) Appl. No.: 09/852,722

(22) Filed: May 11, 2001

(51) Int. Cl.$^7$ ............... F16H 48/06; F16H 48/20
(52) U.S. Cl. ............ 475/230; 475/231; 475/246
(58) Field of Search ............. 475/230, 231, 475/246, 247

(56) References Cited

U.S. PATENT DOCUMENTS

| 4,733,578 | A | * | 3/1988 | Glaze et al. ............ 475/230 X |
| 4,799,402 | A | | 1/1989 | Van Dest |
| 4,914,800 | A | * | 4/1990 | Cook .................. 475/246 X |
| 4,959,043 | A | | 9/1990 | Klotz |
| 5,037,362 | A | | 8/1991 | Teraoka |
| 5,279,186 | A | * | 1/1994 | Martin et al. ............ 475/246 |
| 5,286,239 | A | | 2/1994 | Ito |
| 5,718,653 | A | | 2/1998 | Showalter |
| 5,897,453 | A | | 4/1999 | Mimura |
| 5,980,416 | A | * | 11/1999 | Gafvert ................ 475/230 |
| 6,045,479 | A | | 4/2000 | Victoria |
| 6,061,907 | A | | 5/2000 | Victoria |
| 6,146,304 | A | * | 11/2000 | Bendtsen ............... 475/230 |
| 6,361,467 | B1 | * | 3/2002 | Chen .................. 475/230 |

FOREIGN PATENT DOCUMENTS

| DE | 3814205 | * | 11/1989 | ............. 475/230 |
| GB | 2218762 | * | 11/1989 | ............. 475/230 |

* cited by examiner

Primary Examiner—Ha Ho
(74) Attorney, Agent, or Firm—Liniak, Berenato & White

(57) ABSTRACT

A simplified differential assembly includes a single-piece open-ended hollow differential case and a free-floating differential gear mechanism mounted therewithin. The differential case is provided with a plurality of axial grooves formed on an inner peripheral surface of the differential case and extending between opposite open ends thereof. The differential gear mechanism includes a pinion shaft rotatably supporting a plurality of pinion gears in a free-floating manner, and adapted to drivingly engage the axial grooves of the differential case. The differential case is axially adjustably supported within an axle housing by means of two opposite mounting members. The mounting members are rotatably supporting the differential case at the opposite ends thereof through anti-friction roller bearings. The single-piece differential case may be used for differential assemblies in both open and limited slip configurations.

20 Claims, 8 Drawing Sheets

SIMPLIFIED DIFFERENTIAL ASSEMBLY

BACKGROUND OF THE INVENTION

1. Field of the Invention

The present invention relates to differential assemblies, and more particularly to a differential assembly for motor vehicles, having a single-piece open differential case adjustably supported within an axle housing through a pair of opposite differential mounting members.

2. Description of the Prior Art

Conventionally, differentials well known in the prior art, are arranged in a power transmission system of a motor vehicle to allow a pair of output shafts operatively coupled to an input shaft to rotate at different speeds, thereby allowing the wheel associated with each output shaft to maintain traction with the road while the vehicle is turning. Conventional differentials include a differential case defining a gear chamber, and disposed therein, a differential gear set including at least one input pinion gear, and a pair of output side gears non-rotatably coupled to corresponding axle shafts. Such a device essentially distributes the torque provided by the input shaft between the output shafts. This type of differentials is known in the art as an open differential, i.e. a differential where movements of its various internal components are not restricted in any significant fashion.

The open differentials are unsuitable in slippery conditions where one wheel experiences a much lower coefficient of friction than the other wheel. In such a condition, limited slip differentials are employed that usually include at least one frictional clutch pack typically disposed between the side gear and an adjacent surface of the gear case, such that the clutch pack is operable to limit relative rotation between the gear case and the one side gear.

Conventionally, the differential assemblies comprise a differential case having two complementary halves. A differential pinion shaft is disposed between the two halves bolted together.

The conventional differential assemblies are relatively complex and expensive in manufacturing requiring narrow tolerance zone, and labor extensive in assembling. Furthermore, assembling of the differentials in the limited slip configuration requires laborious process of gauging and selecting the appropriate friction clutch pack.

Thus, there is a need for a differential assembly that is simple, compact and inexpensive to manufacture that includes a simplified differential case that may be used in both open and limited slip configurations.

SUMMARY OF THE INVENTION

The present invention provides a simplified differential assembly having single-piece hollow open-ended differential case and a free-floating differential gear mechanism mounted therewithin. The differential case is provided with a plurality of axial grooves formed on an inner peripheral surface of the differential case and extending between opposite open ends thereof. The differential gear mechanism includes a pinion shaft rotatably supporting a plurality of pinion gears in a free-floating manner, and adapted to drivingly engage the axial grooves of the differential case. The differential gear mechanism further includes a pair of opposite side gears in meshing engagement with the plurality of pinion gears to permit differential rotation thereof.

The differential case is axially adjustably supported within an axle housing by means of two opposite mounting members. The mounting members are rotatably supporting the differential case at the opposite ends thereof through anti-friction roller bearings.

The single-piece differential case in accordance with the present invention may be used for differential assemblies in both open and limited slip configurations.

The first exemplary embodiment of the present invention discloses an open differential assembly further including a thrust washer positioned between the side gear and the roller bearing.

The second exemplary embodiment of the present invention discloses a limited slip differential assembly further including a limited slip mechanism in the form of at least one friction clutch pack disposed between the side gear and the roller bearing. The friction clutch pack includes a number of alternating outer friction plates non-rotatably coupled to the axial grooves formed on the inner peripheral surface of the differential case, and inner friction plates splined to the side gear.

Therefore, the locking differential assembly in accordance with the present invention provides a simple, compact, easy to assemble and inexpensive differential assembly that may be used in both open and limited slip configurations.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

Figure 1:
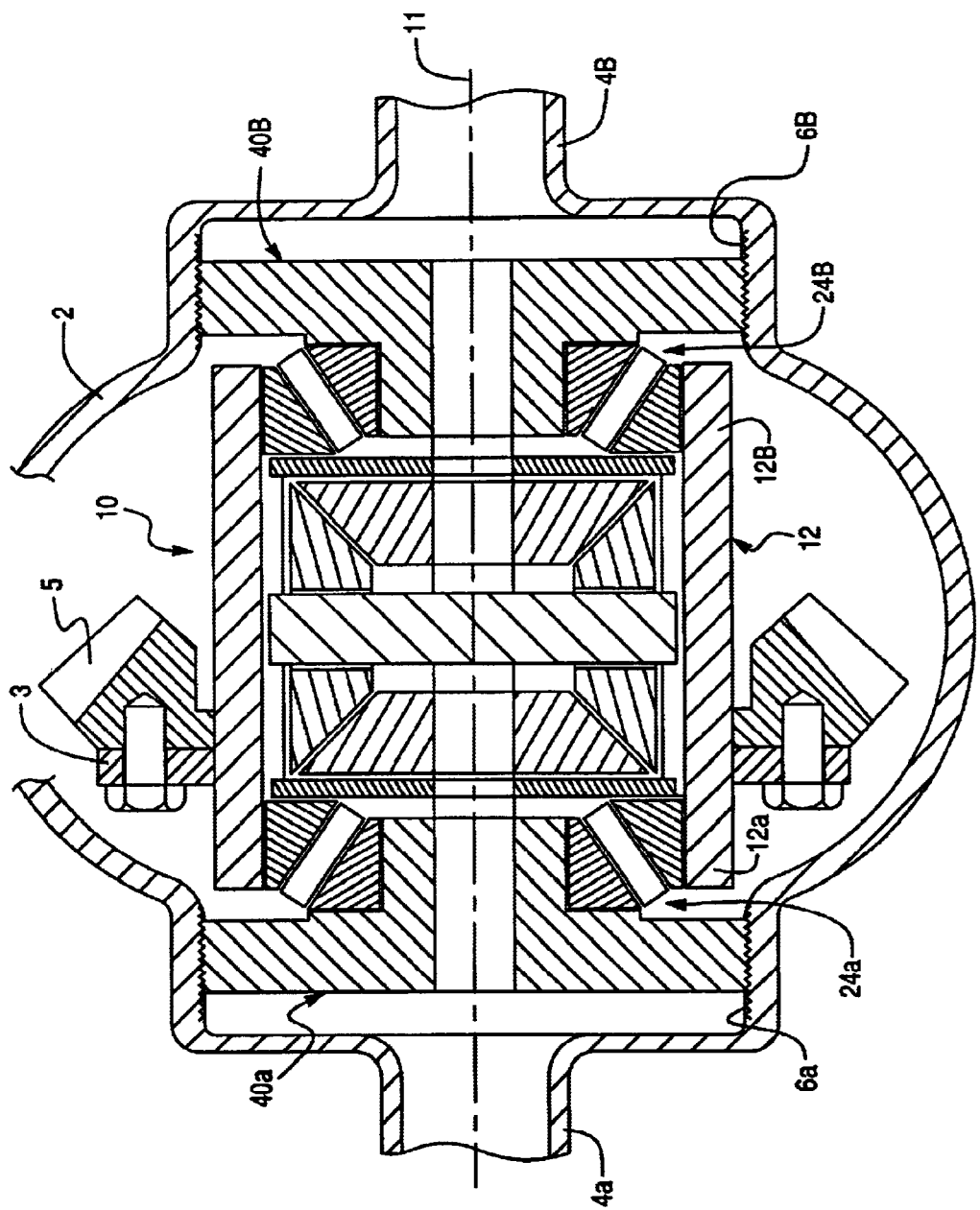
FIG. 1 is a sectional view of an axle housing including a differential assembly in accordance with the first embodiment of the present invention.

The preferred embodiments of the present invention will now be described with the reference to accompanying drawings.

The present invention may be used for both open differential and a limited slip differential.

FIGS. 1–5 of the drawings illustrate the first exemplary embodiment of a differential assembly generally indicated at 10, in accordance with the present invention in the open differential configuration. Reference numeral 12 defines a differential case rotatably supported in an axle housing 2 for rotation about an axis of rotation 11. The axle housing 2 has left and right axle shaft tubes 4a and 4b respectively, projecting coaxially from opposite sides.

The differential assembly 10, as illustrated in detail in FIGS. 2–5, includes a single-piece differential casing 12 in the form of a hollow metal body having two open opposite ends 12a and 12b, a generally cylindrical outer peripheral surface 14 and an inner peripheral surface 16 defining an opening 15 theretrough. Furthermore, the differential casing 12 includes a plurality of axial grooves 18 formed on the inner peripheral surface 16 thereof in a circumferentially spaced apart relationship and extending between the opposite open ends 12a and 12b of the differential case 12.

Driving torque is transmitted to the differential assembly 10 from a vehicular driveshaft (not shown.) through a ring gear 5 mounted to the differential casing 12 by means of a flange 3 welded or otherwise secured thereto.

The differential assembly 10 further comprises a differential pinion gear assembly 30 including a set of pinion gears rotatably supported on a free-floating pinion support member or spider 34 non-rotatably mounted to the differential case 12. The pinion shaft 34 includes a plurality of radially extending shaft portions, each rotatably supporting one of the pinion gears floatingly positioned thereon. Distal ends of the shaft portions of the pinion-support member 34 are drivingly engaging one of the axial grooves 18.

Figure 3:
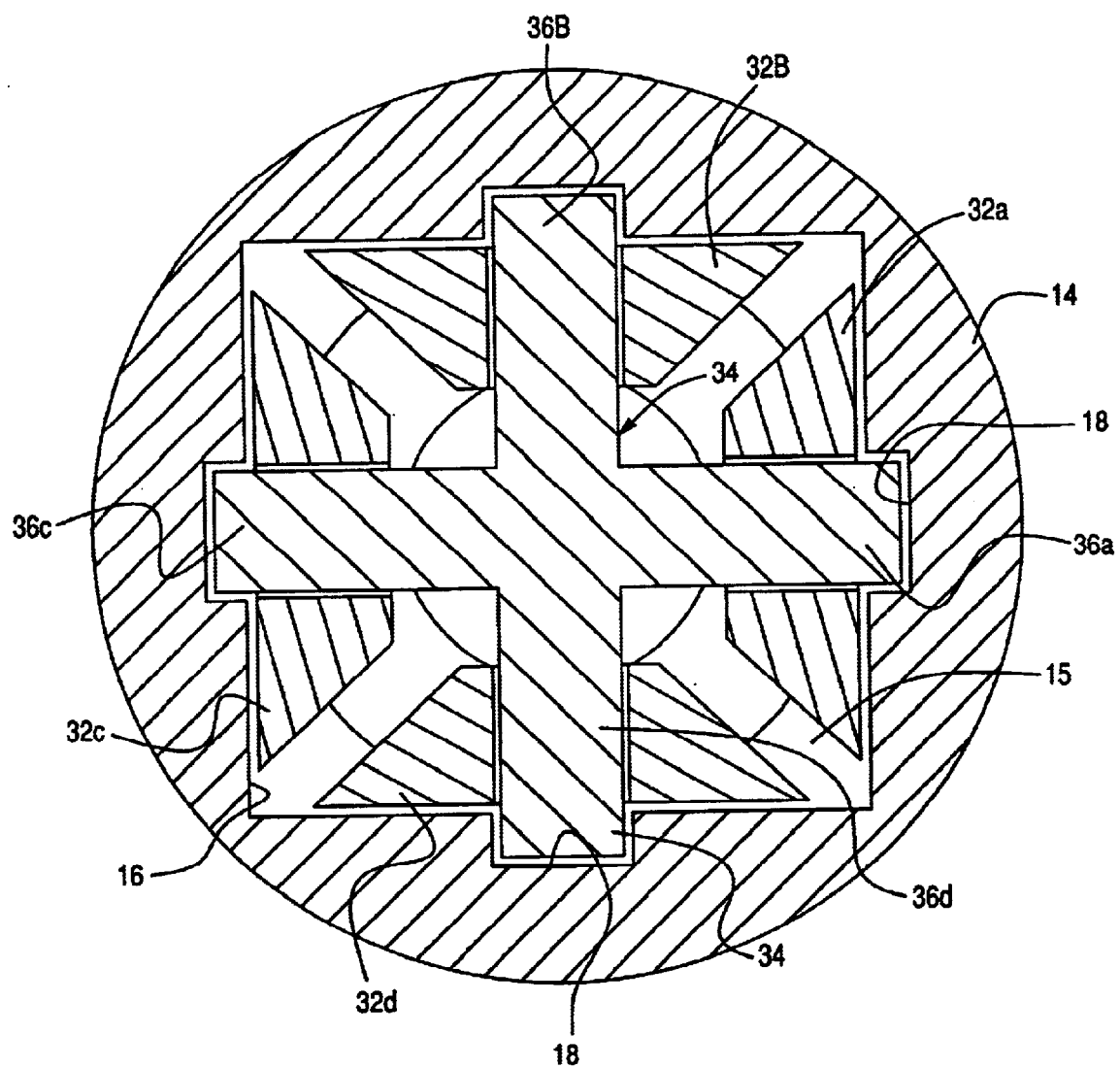
FIG. 3 is a cross-sectional view taken along line 3—3 of FIG. 2.
Figure 4:
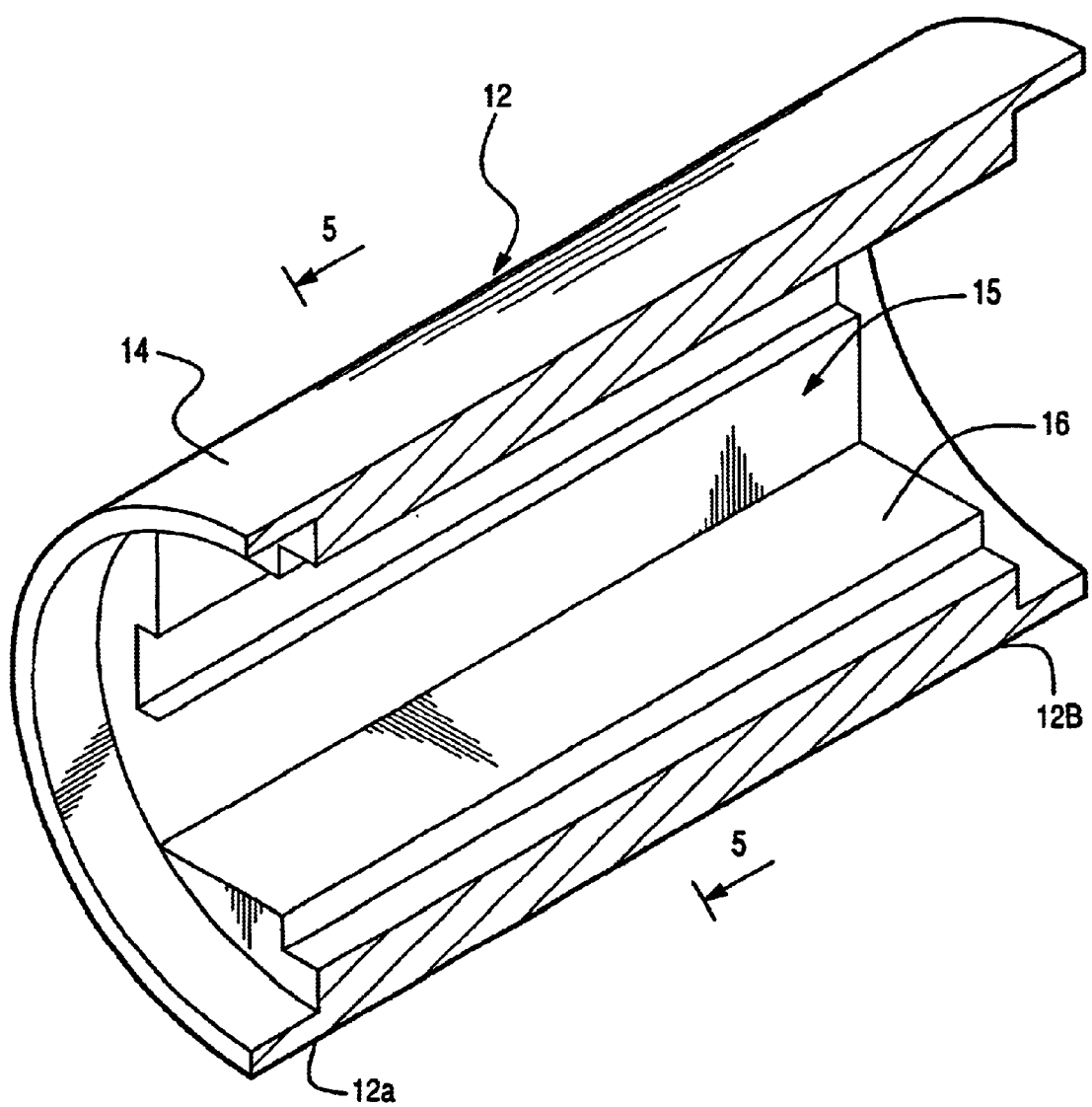
FIG. 4 is a partial perspective view of a differential case of the present invention.
Figure 5:
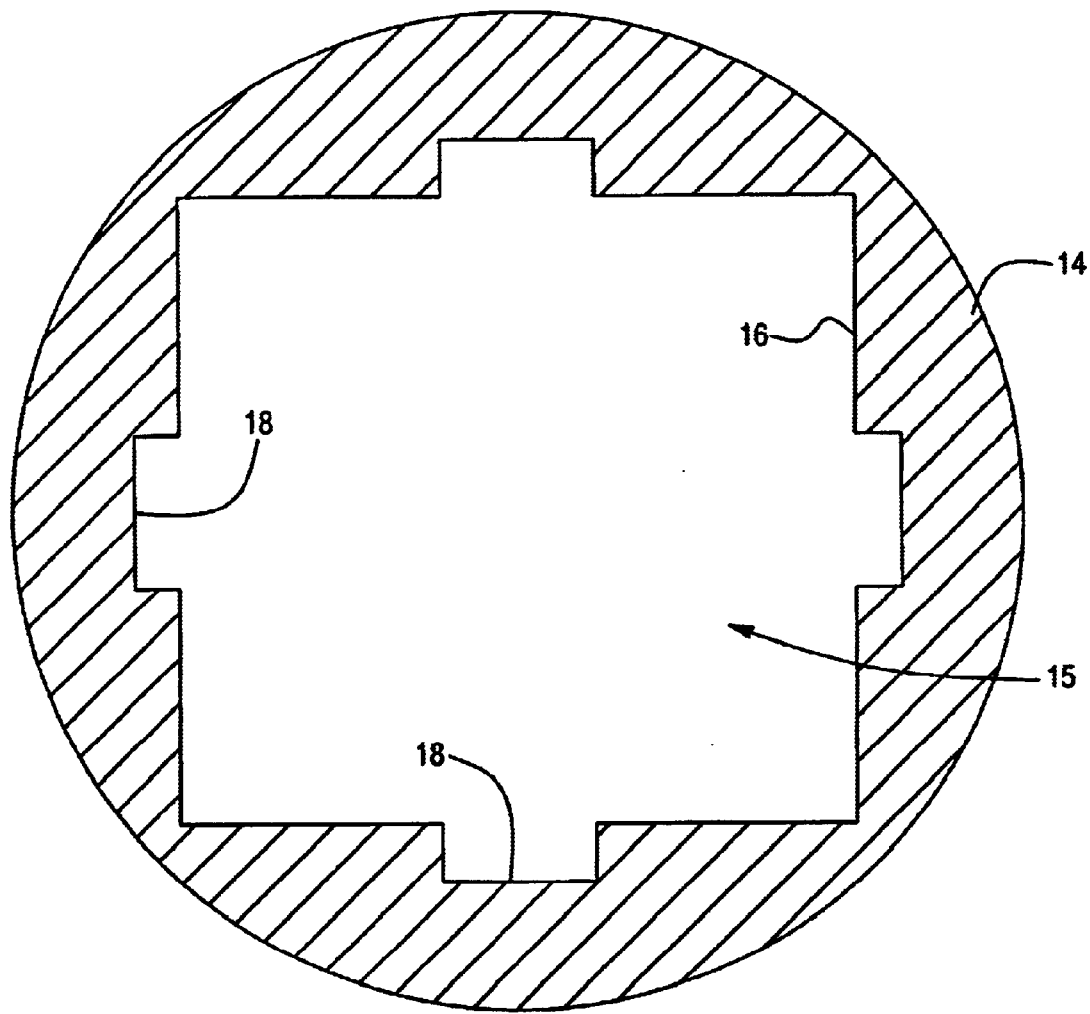
FIG. 5 is a cross-sectional view taken along line 5—5 of FIG. 4.

In the preferred embodiment of the present invention, as illustrated in the FIG. 3, the pinion support member 34 has four radially extending shaft portions 36a, 36b, 36c and 36d, four corresponding pinion gears 32a, 32b, 32c and 32d, and four complementary axial grooves 18 are formed on the inner peripheral surface 16 of the differential case 12, receiving the distal ends of the boss portions 36a, 36b, 36c and 36d of the pinion shaft member 34. It would be appreciated that other numbers of the boss portions of the pinion shaft member, such as two, three etc., are within the scope of the present invention.

The pinion gears 32a, 32b, 32c and 32d are in constant mesh with a pair of opposite side gears 20a and 20b adapted to rotate about the axis 11. The side gears 20a and 20b are splined (or otherwise drivingly coupled) to corresponding opposite output axle shafts (not shown) extending from the differential case 12.

Thus, gear components (the side gears 20a and 20b, the pinion gears 32a, 32b, 32c and 32d, and the pinion support member 34) of the differential assembly 10 in accordance with the present invention are retained within the differential case 12 in a free-floating arrangement.

Figure 2:
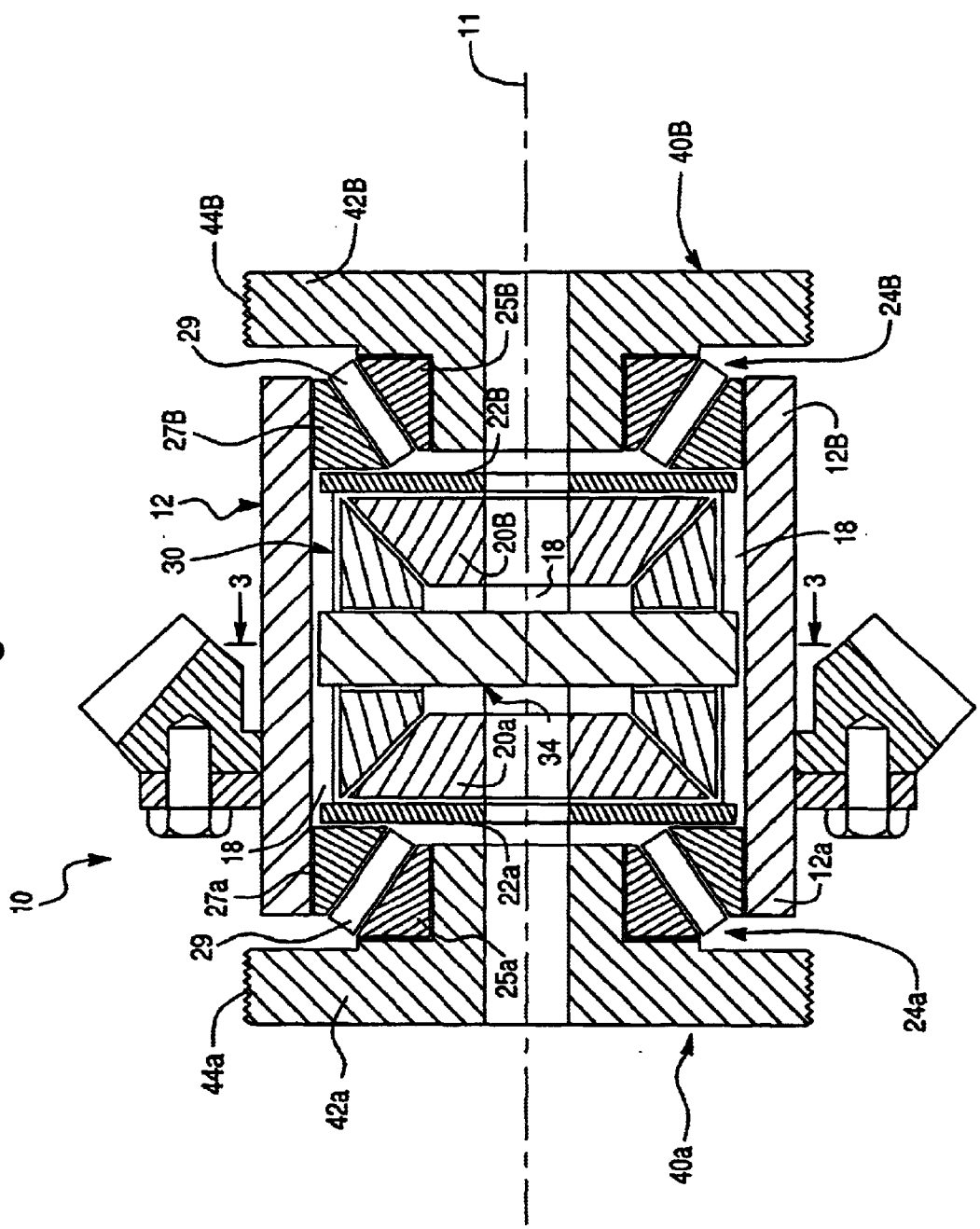
FIG. 2 is a sectional view of the differential assembly in accordance with the first embodiment of the present invention.

As further illustrated in FIGS. 1 and 2, the differential assembly 10 of the present invention includes a pair of opposite mounting members 40a and 40b adapted for mounting the differential case 12 within the axle housing 2. The mounting members 40a and 40b are rotatably supporting the differential case 12 at the opposite ends thereof 12a and 12b correspondingly, trough anti-friction bearings 24a and 24b. The mounting members 40a and 40b are generally annular in shape and made of a metal material, such as aluminum, iron, or steel, similar to material of the differential case 12. Each of the mounting members 40a and 40b includes a mounting flange 42a and 42b respectively, having a threaded outer peripheral surface 44a and 44b adapted to threadedly engage corresponding threaded surfaces 6a and 6b formed on the axle housing 2 to allow rotation and lateral adjustment of the mounting members 40a and 40b relative to the axle housing 2, as shown in FIG. 1. The differential assembly 10 may include two lock brackets (not shown) each connected to the axle housing 2 by suitable fastening means and which engage the mounting members 40a and 40b to prevent rotation thereof.

Alternatively, non-threaded mounting members may be employed, which are axially adjustable by means of conventional shims.

As was noted hereinabove, the differential assembly 10 also includes the anti-friction bearings 24a and 24b disposed between the mounting members 40a and 40b and the differential case 12 to rotatably support the differential case 12 within the axle housing 2. The bearings 24a and 24b are, preferably, tapered roller bearings each having an inner race (25a or 25b) engaging the corresponding mounting member (40a or 40b), an outer race (27a or 27b) secured to the open end (12a or 12b) of the differential case 12 by any appropriate means, such as press-fitting, and a plurality of tapered rollers 29 disposed therebetween. It should be appreciated that the bearings 24a and 24b are conventional and allow the differential case 12 to rotate relative to the mounting members 40a and 40b and the axle housing 2.

Figure 6:
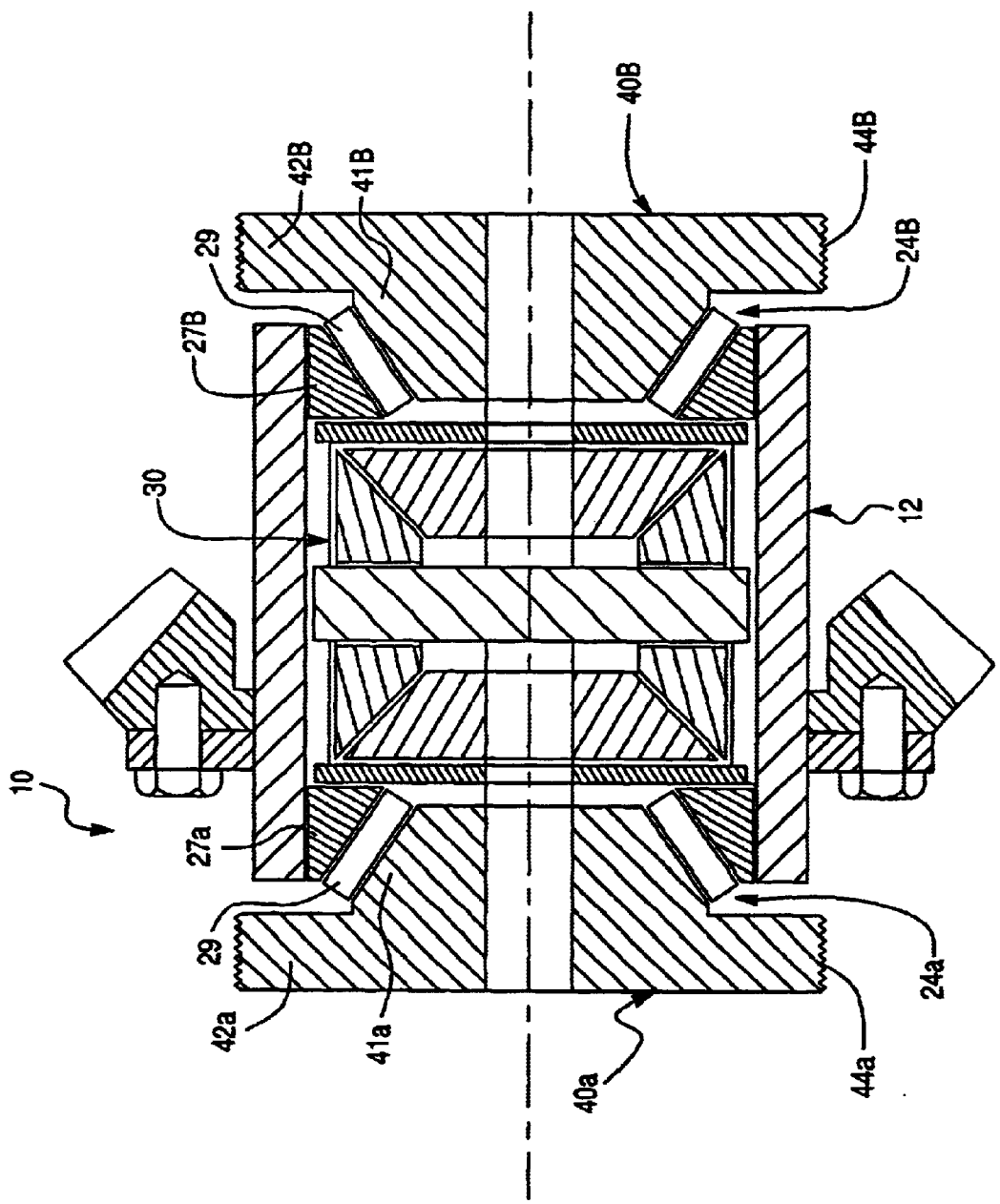
FIG. 6 is a sectional view of the differential assembly in accordance with the first embodiment of the present invention including an alternative embodiment of differential case mounting members.

Alternatively, as illustrated in FIG. 6, each of the mounting members 40a or 40b is provided with an integral inner race portion 41a and 41b correspondingly, integrally formed thereon as a single-piece part.

It will be appreciated that with this arrangement of the differential assembly 10, the position of the differential case relative to the axle housing 2 is axially adjustable to allow adjustment of the ring gear 6 relative to an input pinion gear (not shown).

Moreover, thrust washers 22a and 22b are positioned between the side gears 20a and 20b and the bearings 24a and 24b respectively to transmit forces imposed on the side gears 20a and 20b to respective rear faces of the outer races 27a and 27b of the bearings 24a and 24b correspondingly, and to provide a proper spacing of the side gears 20a and 20b so that it properly engages the pinion gears 32a, 32b, 32c and 32d.

Figure 7:
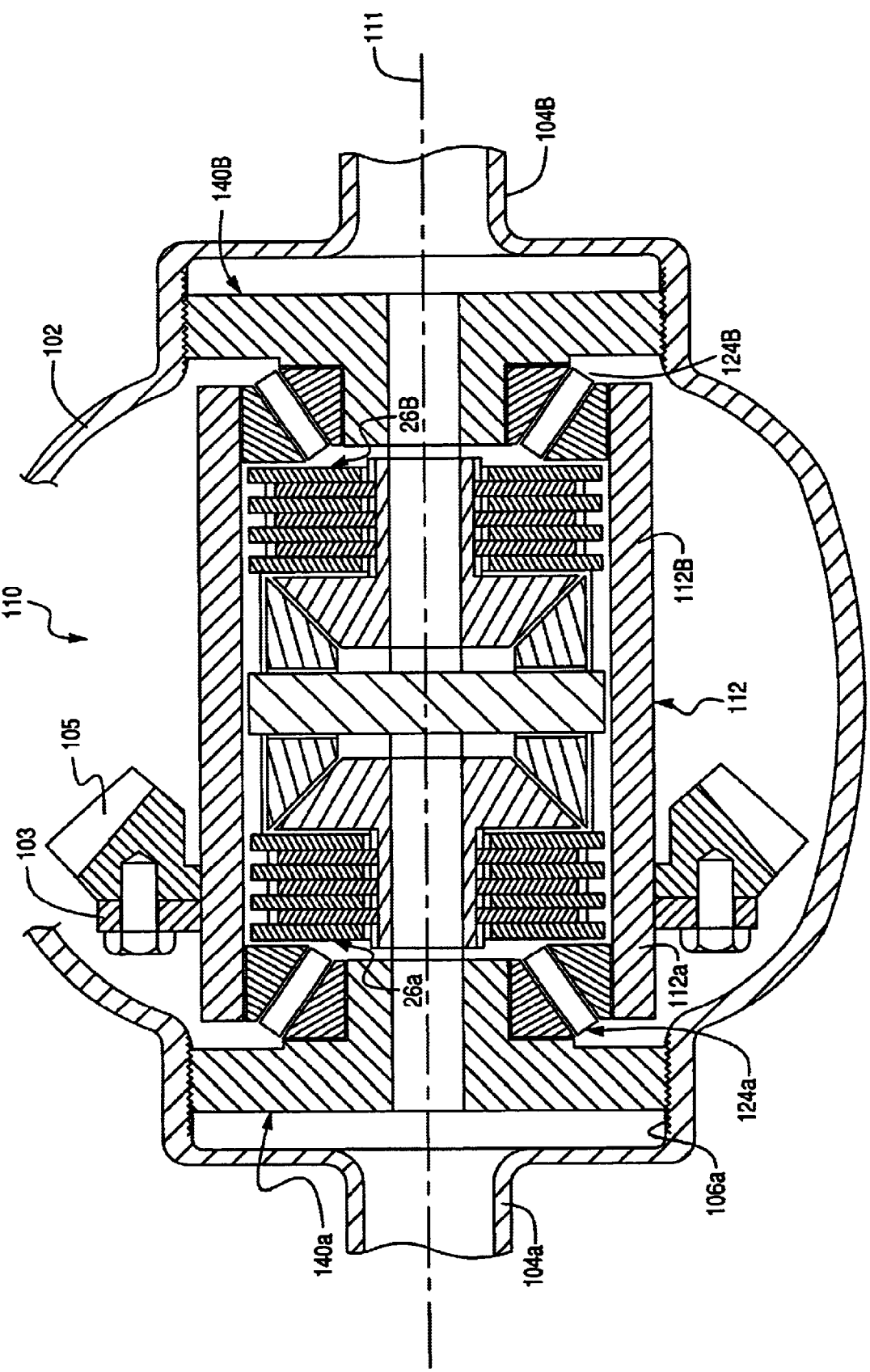
FIG. 7 is a sectional view of an axle housing including a differential assembly in accordance with the second embodiment of the present invention.
Figure 8:
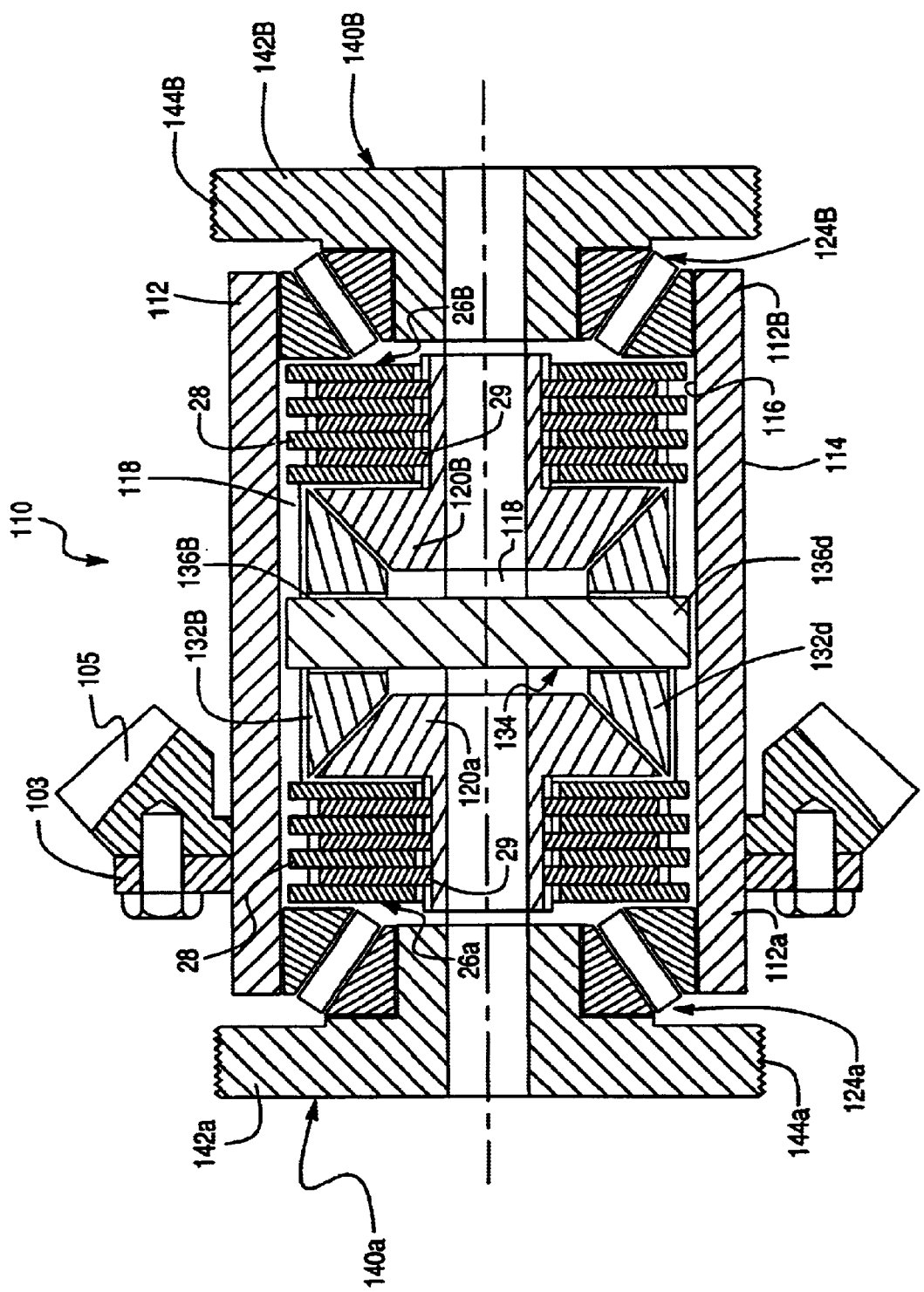
FIG. 8 is a sectional view of the differential assembly in accordance with the second embodiment of the present invention.

FIGS. 6 and 7 illustrate a second exemplary embodiment of the differential assembly in the limited slip differential configuration. In FIGS. 6–7, components, which are unchanged from, or function in the same way as in the first exemplary embodiment depicted in FIGS. 1–5, are designated by the same reference numerals to which 100 has been added.

A limited slip differential assembly 110 of FIGS. 6–7 is structurally similar and substantially corresponds to the open differential assembly 10 of FIGS. 1–5, and only the limited slip device, which differ, will therefore be explained in detail below.

In the limited slip differential assembly 110 in accordance with the second exemplary embodiment of the present invention, a pair of friction clutch packs 26a and 26b is provided within a differential case 112. However, only one friction clutch assembly may also be used. Each of the friction clutch packs 26a and 26b, well known in the prior art, includes sets of alternating outer friction plates 28 and inner friction plates 29. Conventionally, an outer circumference of the outer friction plates 28 is provided with projections that non-rotatably engage the axial slots 118 formed in the differential case 112. At the same time, the outer friction plates 28 are slideable in axial direction. The inner friction plates 29 are splined to the side gear (120a or 120b) so that the inner friction clutch plates 29 are non-rotatably, but axially slidably mounted on the corresponding side gear (120a or 120b).

As illustrated in FIG. 7, the friction clutch packs 26a and 26b are disposed between the side gears 120a and 120b and corresponding bearings 124a and 124b in a free-floating arrangement. Thus, during the assembling of the differential assembly 110, only one clutch pack (26a or 26b) may be gauged. This translates into a drastic reduction of labor and manufacturing cost, and increase in productivity.

Furthermore, the simplified differential assembly of the present invention may be in the form of a locking differential including a hydro-mechanically or electrically actuated locking clutch assembly.

Therefore, the simplified differential assembly in accordance with the present invention represents a novel arrangement of the differential assembly that is simple, compact, easy to assemble and inexpensive in manufacturing, and includes a single-piece differential case that may be used in both open and limited slip configurations.

The foregoing description of the preferred embodiments of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the, art to which this invention pertains. Thus, changes can be made in the above-described invention without departing from the intent and scope thereof. It is also intended that the scope of the present invention be defined by the claims appended thereto.

What is claimed is:

1. A differential assembly comprising:
    a single-piece hollow differential case having an axis of rotation, an inner peripheral surface coaxial to said axis and defining an opening theretrough of a substantially constant cross-section extending between a pair of opposite open ends, said differential case is rotated by an external driving force;
    a differential pinion gear assembly including a pinion shaft having a plurality of radially extending boss portions each rotatably supporting one of a plurality of pinion gears and drivingly engaging said differential case so that said pinion shaft is axially displaceable along said axis; and
    a pair of opposite side gears drivingly engaging said differential pinion gear assembly allowing differential rotation therebetween, wherein
        said differential case is rotatably supported in an axle housing through a pair of opposite differential mounting members secured to said axle housing, said differential mounting members rotatably supporting said inner peripheral surface of said differential case.

2. The differential assembly as defined in claim 1, wherein said differential case has a plurality of axial grooves formed on said inner peripheral surface of said differential case and extending between said opposite open ends, said plurality of axial grooves receiving said plurality of radially extending boss portions of said pinion shaft.

3. The differential assembly as defined in claim 1, wherein each of said mounting members is provided with a mounting flange including a threaded outer peripheral surface threadedly engaging a corresponding threaded surface formed on said axle housing to allow rotation and lateral adjustment of said mounting member relative to said axle housing.

4. The differential assembly as defined in claim 1, wherein each of said mounting members is axially adjustably mounted to said axle housing.

5. The differential assembly as defined in claim 1, further including a pair of anti-friction bearings each disposed within said differential case between said inner peripheral surface of one of said ends of said differential case and corresponding differential mounting member.

6. The differential assembly as defined in claim 5, wherein each of said mounting members is provided with an inner race of said anti-friction bearing.

7. The differential assembly as defined in claim 6, wherein said inner race of said anti-friction bearing is integrally formed with said mounting member.

8. The differential assembly as defined in claim 5, wherein said differential case has a counterbore at each of said opposite ends thereof for receiving said anti-friction bearings.

9. The differential assembly as defined in claim 1, further including at least one friction clutch assembly disposed at one of said ends of said differential case.

10. The differential assembly as defined in claim 9, wherein said friction clutch assembly includes a plurality of inner friction plates interleaved with a plurality of outer friction plates, said inner friction plates are non-rotatably coupled to one of said side gears and said outer friction plates are non-rotatably coupled to said differential case.

11. The differential assembly as defined in claim 2, further including at least one friction clutch assembly disposed at one of said ends of said differential case.

12. The differential assembly as defined in claim 11, wherein said friction clutch assembly includes a plurality of inner friction plates interleaved with a plurality of outer friction plates, said inner friction plates are non-rotatably coupled to one of said side gears and said outer friction plates are provided with a plurality of tabs engaging said axial grooves on said inner peripheral surface of said differential case.

13. A differential assembly comprising:
    a single-piece hollow differential case having an axis of rotation, an inner peripheral surface coaxial to said axis and defining an opening theretrough of a substantially constant cross-section extending between a pair of opposite open ends, said differential case is rotated by an external driving force;
    a differential pinion gear assembly including a pinion shaft having a plurality of radially extending boss portions each rotatably supporting one of a plurality of pinion gears and drivingly engaging said differential case;
    a pair of opposite side gears drivingly engaging said differential pinion gear assembly allowing differential rotation therebetween; and
    a pair of opposite differential mounting members extending into said open ends of said differential case for rotatably supporting said differential case in an axle housing at said opposite ends of said differential case.

14. The differential assembly as defined in claim 13, further including a pair of anti-friction bearings each disposed between said ends of said differential case and said differential mounting members.

15. The differential assembly as defined in claim 14, wherein each of said mounting members is provided with an integral inner race portion of said anti-friction bearing integrally formed therewith.

16. The differential assembly as defined in claim 13, wherein said mounting members are axially adjustably mounted to said axle housing.

17. The differential assembly as defined in claim 13, wherein said differential case has a plurality of axial grooves formed on said inner peripheral surface of said differential case and extending between said opposite open ends, said plurality of axial grooves receiving said plurality of radially extending boss portions of said pinion shaft.

18. The differential assembly as defined in claim 13, further including at least one friction clutch assembly disposed at one of said ends of said differential case.

19. The differential assembly as defined in claim 17, further including at least one friction clutch assembly disposed at one of said ends of said differential case.

20. The differential assembly as defined in claim 19, wherein said friction clutch assembly includes, a plurality of inner friction plates interleaved with a plurality of outer friction plates, said inner friction plates are non-rotatably coupled to one of said side gears and said outer friction plates are provided with a plurality of tabs engaging said axial grooves on said inner peripheral surface of said differential case.

* * * * *